March 2, 1943.    H. J. MEIER    2,312,570
BOILER FEED WATER CONDITIONING EQUIPMENT AND METHOD
Filed March 9, 1939    2 Sheets-Sheet 2
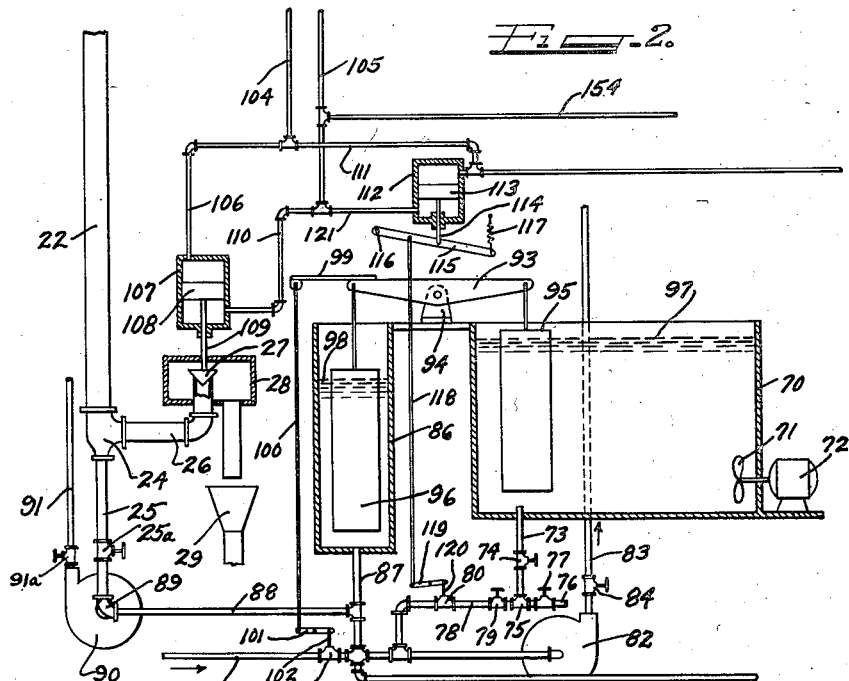
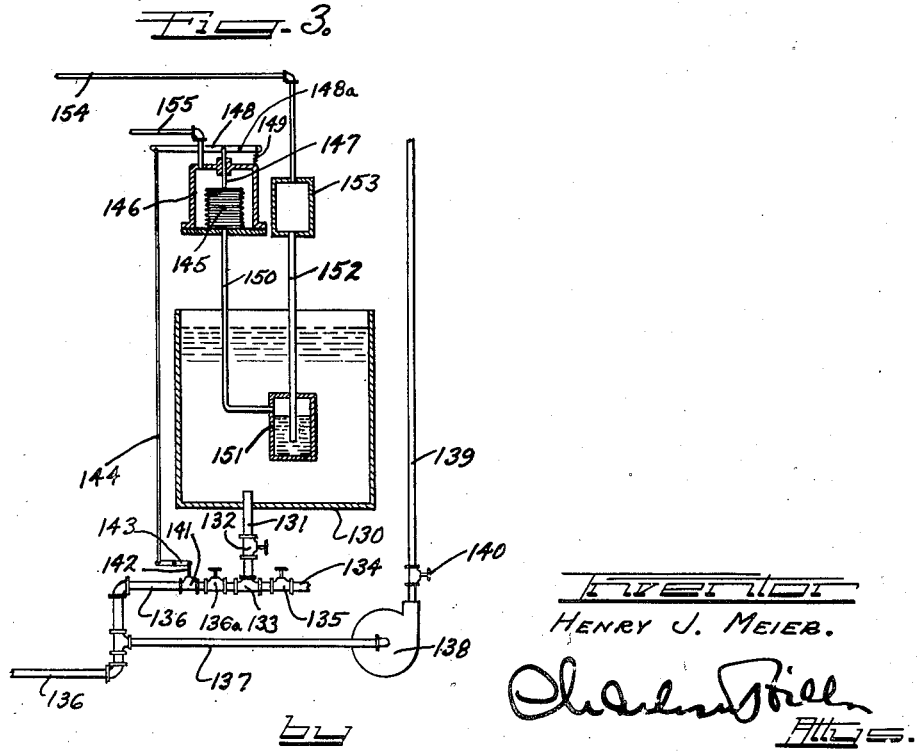
Inventor
HENRY J. MEIER.

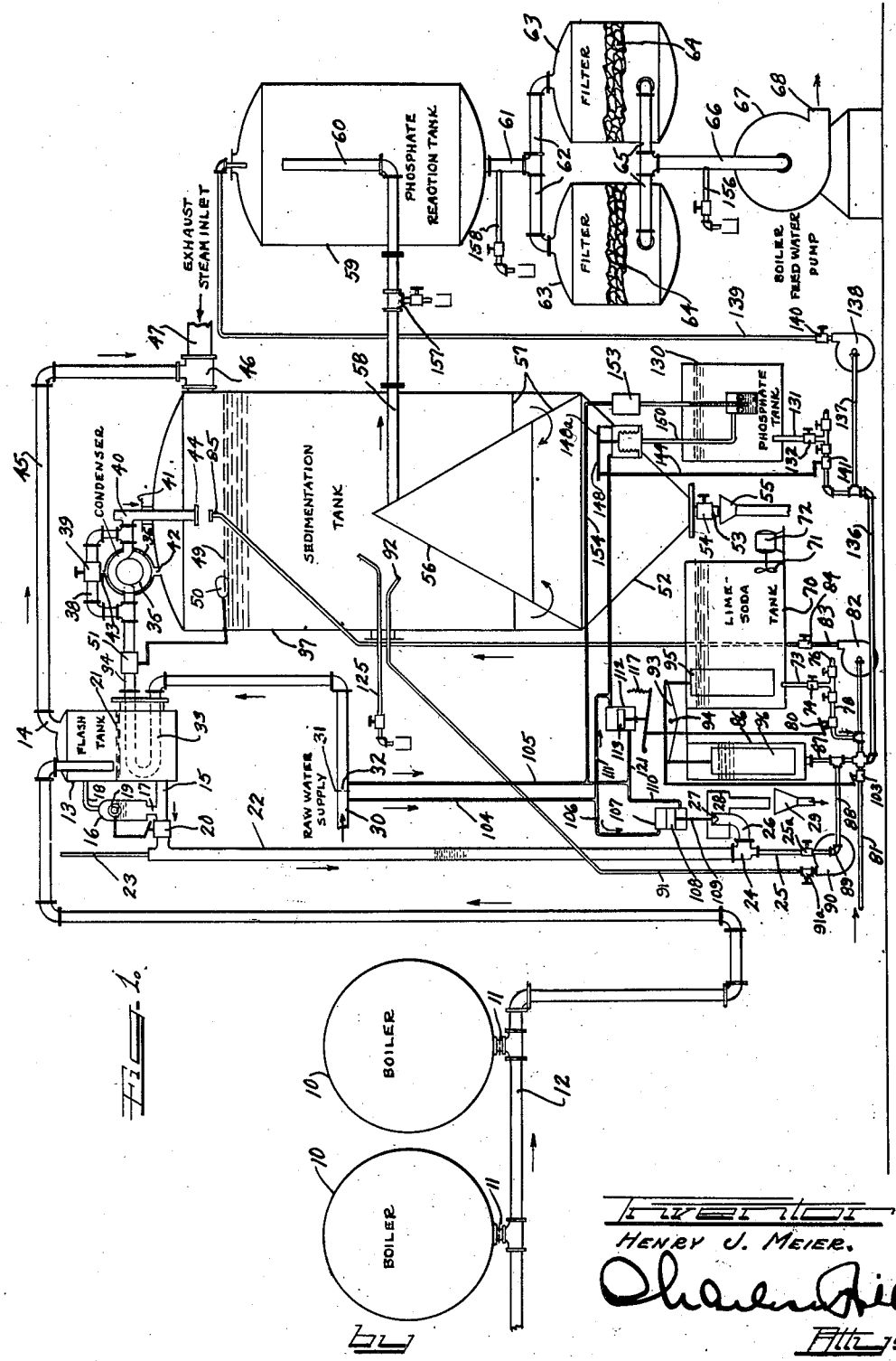

Patented Mar. 2, 1943

2,312,570

UNITED STATES PATENT OFFICE 2,312,570

BOILER FEED WATER CONDITIONING EQUIPMENT AND METHOD

Henry J. Meier, Chicago, Ill.

Application March 9, 1939, Serial No. 260,669

19 Claims. (Cl. 122—401)

This invention relates to a process of softening water to any predetermined degree and down to zero hardness if desired, so as to produce, with a minimum quantity of treating chemicals, a concentrated boiler water of reduced suspended content or devoid of suspended matter. The invention also relates to equipment for automatically carrying out the process economically, accurately and constantly at varying rates of load.

According to this invention, raw water is subjected to an ordinary hot process lime-soda treatment, and the thus treated water then has its alkalinity increased by means of recirculated boiler water so as to reduce the soluble calcium carbonate hardness to a minimum before adding reagents such as phosphates, aluminates, tannates or the like, which will react with and precipitate the last traces of calcium and magnesium hardness in the water.

The lime-soda treatment includes subjecting the raw water to a mixture of soda ash and lime water (calcium hydroxide). The calcium hydroxide or lime combines with excess carbon dioxide in the water and reacts with calcium and magnesium bicarbonates to form less soluble calcium carbonate and magnesium hydroxide. The soda ash is added so as to react with the calcium sulphate in the water to form sodium sulphate and calcium carbonate.

According to this invention, the insoluble reaction products from the lime-soda treatment are settled out as sludge in a first stage treating tank and the lime-soda treated water with its residual hardness is then treated with a phosphate or similar reagent in a second stage treating tank, or integral compartment of the first stage tank, to precipitate the remaining calcium. The precipitated salts are then removed from the treated water either by filtering it through beds of anthracite coal, by a settling process or by any other method of water clarification.

It has been known that the hardness of the water leaving the first stage of a hot process softener decreases with an increase in excess soda ash. Likewise, an increase in caustic alkalinity beyond the point where bicarbonates can no longer exist, and an increase in total soluble solids, in the treated water will tend to reduce the residual calcium carbonate hardness to a lower point because these increases affect the solubility of calcium carbonate.

Since modern boiler operating practice demands a low carbonate and caustic alkalinity content in the concentrated boiler water, a minimum excess of lime and soda ash must be used in the ordinary hot process lime-soda softening system.

According to this invention, the water leaving the upper section of the first stage treating tank is tested by the usual chemical indicator methods, such as phenolphthalein, methyl orange and soap, to ascertain the hardness of the water at this stage, in order to keep proportions and quantities of lime and soda ash being fed at the required strength.

In order to further reduce the soluble calcium carbonate hardness and also to properly prepare this water so that only a minimum of secondary treating chemical such as phosphates, tannates, aluminates, etc., will be used, and last but not least so as to make it possible for the secondary treating chemicals to react with the last minute traces of calcium hardness, the smallest possible quantity of boiler recirculating water is introduced into the central section of the sedimentation tank by means of a continuous blow down flash tank, a proportioner and booster pump. Since the boiler recirculating water always has a caustic alkali content, its introduction into the sedimentation tank maintains a definite but minimum caustic alkalinity in the water issuing from the outlet of the softening system.

The apparatus of this invention is automatic in operation and is actuated by a pressure drop in the raw feed water as the water passes through an orifice. Differential proportioners are provided for feeding lime-soda solution to the first stage treating tank, for feeding phosphate solution to the second stage treating tank and for regulating the feeding of recirculated boiler blown down water to either or both of the treating tanks or compartments. These differential proportioners can include diaphragms, pistons, Sylphon bellows and the like connected either directly or by means of springs, weights or mercury columns to the chemical supply lines.

Buoyancy floats are also provided in one of the chemical supply tanks to actuate a dilution water valve so that all chemical feed pumps will have a positive inlet suction pressure or head. The dilution water valve mechanism will maintain a constant drop across all chemical feed valves irrespective of the height of chemicals in the supply tanks, so that a change in the differential pressure of the raw water flow will cause a proportional change in the flow of chemicals from their respective chemical tanks.

The blow down from each boiler is regulated by needle valve or orifice adjustment and is discharged to an elevated flash tank from which it is drained to a differential proportioner which will adjust the quantity of recirculated boiler water to a minimum constant percentage of the make-up or raw feed water requirement of the plant. The recirculated water or blow down water is diluted and pumped to either the first or second stage treating tanks or both and the percentage of recirculation is readjusted as the hardness of the lime-soda or phosphate treated water will dictate. This can be determined by the usual chemical indicator tests on samples drawn from the proper spigots in the tank. The percentage of recirculation is varied by adjustment of an orifice valve. The feed of phosphate chemicals to the second stage tank is kept at a minimum as indicated by a test for excess of phosphate existing in the water leaving this softening system.

It is, then, an object of this invention to provide a hot-process water-softening system operable with a minimum quantity of treating chemicals to produce water of zero hardness if desired.

Another object of the invention is to produce a lime-soda treated boiler water free from suspended matter with a minimum of alkalinity and phosphate content.

A further object of the invention is to utilize boiler blow-down water for supplying part of the excess chemicals used in the water softener reaction tanks.

A further object of the invention is to decrease the amount of boiler blow-down or discharge to the sewer in a boiler plant by use of blow down water in a water softener.

A specific object of the invention is to provide a hot process lime-soda and complete phosphate treatment of boiler feed water by means of accurate continuous proportioners which are actuated by the raw feed water requirements of the boiler plant.

Another specific object of this invention is to provide a simplified form of differential chemical proportioner which requires only one chemical pump to deliver the proportioned quantity of treating chemical or proportioned quantity of blow down water for recirculation.

A further object of the invention is to provide a process for softening water wherein dilution water from either an outside source or from the sedimentation tank effectively dilutes chemical charges so that they can be pumped by centrifugal pumps to the treating tanks or compartments thus to supply just enough chemicals continuously so as to carry out the desired water softening reactions.

Other and further objects of the invention will become apparent to those skilled in the art from the following detailed description of the annexed sheets of drawings which disclose a preferred embodiment of the invention.

On the drawings:

Figure 1 is a diagrammatic elevational view of of a boiler feed water softening apparatus according to this invention.

Figure 2 is an enlarged, fragmentary, diagrammatic elevational view, with parts shown in vertical cross section, of a portion of the apparatus shown in Figure 1.

Figure 3 is an enlarged fragmentary diagrammatic elevational view, with parts shown in vertical cross section, of another portion of the apparatus shown in Figure 1.

As shown on the drawings:

In Figure 1, the reference numerals 10—10 designate boiler shells having blow-offs 11—11 at the bottoms thereof communicating with a pipe line 12. The pipe line 12 can also communicate with additional blow-offs of other boilers of a plant (not shown on the drawings). The combined blow-down liquid or sludge from all of the boilers is conveyed through the pipe line 12 into a flash tank 13 having a steam outlet 14 at the top thereof and a liquid outlet 15 at the bottom thereof. A float chamber 16 has a liquid inlet 17 communicating with the outlet of the flash tank 13 and a steam equalizer pipe 18 at the top thereof communicating with the steam space of the flash tank.

A float 19 is mounted in the float chamber and controls a gate valve 20 in the outlet 15 from the flash tank. The gate valve 20 is positioned beyond the inlet 17 to the float chamber. The float 19 maintains a predetermined liquid level 21 in the flash tank. When this liquid level 21 rises above a predetermined point, the float 19 will open the valve 20 to discharge liquid into a standpipe 22. The standpipe 22 is vented at the top thereof by means of a vent tube 23. The bottom of the standpipe 22 has a pipe fitting 24 which is provided with a bottom outlet receiving a pipe line 25 and a side outlet receiving the lower end of an upwardly curved pipe line 26. A manually operated valve 25a is mounted in the pipe line 24 to act as an orifice for regulating the flow of boiler circulating water from the standpipe.

The upper end of the pipe 26 is adapted to be closed by a hydraulic operated plug or valve disc 27. The pipe 26 discharges a quantity of boiler blow-down water into a receptacle 28 when the plug 27 is lifted off the top of the pipe. The chamber 28 discharges boiler blow-down water to a drain 29 communicating with a sewer (not shown). As will be hereinafter described, the plug 27 is operated by differential pressure existing in the raw water feed line. Since excess blow-down water is fed to the standpipe 22, it will always contain a column of water exerting a hydraulic pressure equal to the differential pressures existing in the feed line.

Raw feed water for the boilers 10 is supplied to a feed pipe 30. A restriction 31 is mounted in the supply line 30 which may be either a Venturi nozzle or a removable orifice plate with a small orifice 32 therethrough. The pipe 30 is connected to a heat exchanger coil 33 in the lower portion of the flash tank 13 so as to minimize or obviate the flash steam formation between the valve 20 and standpipe 22. The coil 33 discharges into a pipe line 34 communicating with the water coil 35 of a condenser 36 mounted on top of a sedimentation tank 37. A bypass pipe line 38 extends around the condenser 36 and is provided with a valve 39 which is closed during the normal operation so as to permit a maximum recovering of heat from the vented gas and air being discharged from sedimentation tank 37 through the vent pipe 42, condenser 36 and bleeder outlet 43 to the atmosphere.

A jet heater 40 of the customary type extends through the top of the sedimentation tank 37 and is mounted on the manhole plate 41 which is in the top of the tank. The jet heater receives the water from the condenser coil 35 or from the bypass pipe line 38. The water supplied to the jet heater 40 is sprayed into the tank 37 through a spray head 44 located at the lower end of the heater in the top portion of the tank.

The steam outlet 14 from the flash tank 13 receives a pipe line 45 communicating with the steam inlet 46 to the top of the tank 37. Additional steam to heat the incoming raw water is supplied to the inlet 46 through a steam pipe 47 which may be connected with a source of exhaust steam from prime movers or auxiliaries of the boiler plant.

The raw feed water from the pipe 30 is thus heated by the hot blow-down liquid in the flash tank 13, by steam and hot air passing from the tank 37 into the condenser 36 before it is sprayed into the steam in the top of the tank 37. A constant liquid level 49 of water is maintained in the tank 37 by a float 50 which controls a valve 51 in the pipe line 34. When the float 50 rises the valve 51 is closed to shut off the water supply to the spray 44.

The tank 37 has a hopper bottom 52 for the collection of sludge or other precipitated solids in the tank. The collected or settled sludge is then periodically drained from the bottom of the hopper 52 through a drain line 53 equipped with a hand-operated valve 54. The drainage from the line 53 can be dumped into a sewer drain 55.

The sedimentation tank 37 has an inverted cone member 56 mounted therein on legs and braces 57 which hold the mouth of the cone in spaced relation from the bottom and from the side walls of the tank. The apex of the cone receives an outlet pipe 58 extending through the side wall of the tank 37 and into a phosphate reaction tank 59. The pipe 58 receives an upturned leg 60 in the center of the tank 59. The leg 60 terminates in a spaced relation from the top of the tank 59 at a level below the liquid level 49 in the tank 37.

The tank 59 has a drain line 61 in the bottom thereof receiving branch pipes 62 which communicate with the tops of filter units 63. Each filter unit 63 preferably has a bed 64 of filtering material such as graded courses of fine anthracite coal. The filter tanks 64 are drained through drain pipes 65 communicating with the inlet pipe 66 of a boiler feed water pump 67. The discharge side 68 of the pump 67 can communicate with the boilers 10 to supply softened boiler water thereto.

The heated feed water sprayed into the sedimentation tank 37 is treated with a lime-soda solution fed to the tank by a proportioning device to be hereinafter described. The reaction products precipitated from the water in the tank 37 can settle to the bottom of the tank. The treated water, however, flows into the mouth of the cone 56 and is discharged from the apex of the cone through the pipe 58 into the phosphate tank 59 where it is further treated to reduce the soluble calcium carbonate hardness thereof, and to precipitate additional salts remaining in the water. The phosphate treating solution is supplied to the tank 59 by means of a proportioning device which will be hereinafter described. The phosphate-treated water is then filtered through the filter bed 64 and supplied to the boiler by the boiler feed pump 67.

As best shown in Figures 1 and 2, the lime-soda solution for the sedimentation tank 37 is prepared in a tank 70 equipped with an agitator 71 driven by a motor 72. The solution in the tank 70 is drained therefrom through a pipe line 73 communicating with the bottom of the tank. The pipe line 73 has a manually operated valve 74 therein and is joined to a T 75. One branch of the T 75 receives a pipe line 76 having a manually-operated valve 77 therein. The pipe 76 can be connected with other tanks if desired or may be used as a dump for the tank 70. The other branch of the T 75 receives a pipe line 78 having a manually-operated valve 79 therein. A regulating orifice valve 80 is also provided in the pipe line 78. The regulating orifice valve 80 is automatically controlled as will hereinafter be described.

The pipe line 78 communicates with a dilution-water feed line 81 connected to a centrifugal pump 82. The discharge side of the pump 82 receives a pipe line 83 having a valve 84 therein. The pipe line 83 enters the sedimentation tank 37 and receives a spray head 85 on the end thereof. The spray head 85 is positioned under the heater spray head 44 at a level in the tank 37 above the liquid level 49. The centrifugal pump 82 thereby supplies a lime-soda solution to the tank 37 in spray form.

For obvious reasons, the pumping capacity of centrifugal pump 82 will be larger than necessary, hence the valve 84 is throttled but always allows passage of the maximum amount of proportioned chemical that may be demanded by the system. Obviously, during light load periods a greater quantity of dilution water must be added to the proportioned chemical in order to satisfy the throttled capacity of the centrifugal pump 82.

A float tank 86 is mounted alongside of the lime-soda tank 70 and has the bottom thereof somewhat lower than the bottom of the tank 70. The float tank 86 receives a pipe line 87 through the bottom thereof. The pipe line 87 is connected to the dilution-water feed line 81 and also to a pipe line 88. The pipe line 88 receives a fitting 89 on the end thereof. One connection of the fitting 89 receives the pipe line 25 from the blow-down water standpipe 22. A third connection of the fitting 89 is joined with the inlet of a pump 90. The pump 90 discharges through a throttle valve 91a into a pipe line 91 entering the sedimentation tank 37 and having a nozzle end 92 in the tank below the liquid level 49.

A balance beam 93 is mounted above the tanks 70 and 86 on a pivotal support 94. One end of the beam suspends a buoyancy float 95 in the tank 70, while the other end of the beam suspends a buoyance float 96 in the tank 86. The buoyancy float 96 is suspended at a lower level than the buoyancy float 95 so that the liquid level 97 in the tank 70 will be from twelve to twenty-four inches higher than the liquid level 98 in the tank 86, as will be hereinafter described.

The beam 93, from which the float 96 is suspended, carries an extension member 99 receiving a link rod 100 on the end thereof. The link rod 100 is connected to one end of a centrally pivoted lever arm 101. The other end of the lever arm 101 operates the control rod 102 of a regulating orifice valve 103 in the dilution-water feed line 81. The valve 103 is positioned ahead of the pipe line 87 to the float tank 86 so that water will be supplied to the tank 86 when the liquid level 98 falls more than a predetermined amount below the liquid level 97 in the tank 70. The buoyancy floats 95 and 96 operating the dilution water valve 103 only open the valve when the liquid level 98 falls more than a predetermined distance below the level of the lime-soda solution 97. The floats promptly close the valve when the desired difference in levels is reached. Since the liquid level 97 is always above the liquid level 98, the dilution water will not enter the pipe line 78 even if the valve 80 therein is open.

The plug or valve disc 27 for the blow-off water standpipe 22 and the valve 80 in the lime-soda pipe line 78 are automatically controlled by the drop in pressure caused by the flow of the raw water in the feed line 30 as it passes through the orifice 32 whenever the float 50 opens the valve 51. For this purpose, a pipe line 104 communicates with the feed water line 30 at a point ahead of the orifice 32 therein. A second pipe line 105 communicates with the feed pipe 30 at a point beyond the orifice 32. A branch 106 of the pipe line 104 communicates with the high pressure side of a piston chamber 107 having a piston 108 slidable therein and connected through a piston rod 109 to the plug or valve disc 27.

A branch 110 of the pipe line 105 communicates with the low pressure side of the piston chamber 107 beneath the piston 108 therein. A second branch 111 of the pipe line 104 communicates with the high pressure side or top of a piston chamber 112 having a slidable piston 113 therein. The piston 113 has a piston rod 114 connected to a central portion of a pivoted lever arm 115. One end of the lever is pivoted as at 116 while the other end is connected to a tension spring 117. A valve operating rod 118 is connected to the arm 115 between the pivot point 116 and the point of connection to the piston rod 114. The rod 118, in turn, is connected to one end of a centrally pivoted lever arm 119. The other end of the lever arm 119 is connected to the operating rod 120 of the regulating orifice valve 80. A branch pipe 121 extends from the pipe line 105 to the low pressure side of the piston chamber 112 beneath the piston 113 therein.

In operation, raw water is supplied to the tank 37 whenever the liquid level 49 falls to cause the float to open the valve 51 in the raw water line 30. When no feed water is removed from the system by the boiler feed water pump 67, the valve 51 is closed, no water flows through the pipe 30, and the pressure on both sides of the orifice 32 is equalized. Under these conditions, however, the pumps 82 and 90 are still operating and are supplied with dilution water so that they will always have a positive pressure at their inlets determined by the level 98 in the float tank 86. The plug valve 27 will then be wide open, because the head pressure of water in the standpipe will be sufficient to overcome the weight of the piston 108. Blow-off water will then drain to the sewer through the drain 29, and there will be practically no flow of boiler circulating water through the orifice valve 25a because there is practically no head pressure in the standpipe 22.

Under the same equalized pressure conditions, the spring 117 will hold the valve 80 closed so that no chemical solution will be removed from the tank 70.

When the raw feed water is not flowing into the system, the boiler blow-down automatically goes to the sewer and no chemical is supplied to the sedimentation tank. However, when the boiler feed pump 67 is operated to withdraw water from the system, the liquid level 49 will fall and the valve 51 will open, thereby causing a raw water flow and a differential pressure through the orifice 32. The pistons 108 and 113 will then operate in accordance with the pressure differential between the two sides of the orifice. The piston 113 will operate the valve 80 to supply a proportioned quantity of lime-soda solution to the pump 82.

The piston 108 will operate the plug valve 27 to thus build up a head pressure in the standpipe 22 until it is equal to the differential pressure, and thus the proportioned boiler circulating water will be supplied to the pump 90. The orifice valve 25a controlling the flow of blow-off water into the pump 90 is throttled down so that the inlet of the pump 90 will receive both blow-down water and dilution water from the float chamber 86 or the supply line 81, as determined by chemical tests on samples of water drawn from the spigots 157 or 158. The strength of chemicals supplied to the sedimentation tank can be changed in accordance with chemical tests of samples withdrawn from a sampling tube 125 communicating with the central portion of the sedimentation tank.

From the above description, it should be understood that the strength of treating chemicals supplied to the sedimentation tank is regulated in accordance with the hardness of raw water supplied to the tank, and that the quantity of the supplied chemicals is automatically regulated in accordance with the amount of the raw water going to the sedimentation tank. Chemicals available in the blow-down water are utilized by supplying a proper quantity of boiler circulating water directly to the sedimentation tank.

The phosphate reaction tank is likewise automatically supplied with phosphate in accordance with the requirements of the water being treated. For this purpose, a phosphate tank 130 is provided for the preparation and storage of phosphate solution, such as an aqueous solution of mono-sodium phosphate. The tank 130 is drained through a drain line 131 having a manually operated gate valve 132 therein. The pipe line 131 receives a T fitting 133, as best shown in Figure 3. One branch of the T fitting receives a pipe 134 having a valve 135 therein permitting connection of the drain 132 with another phosphate tank drain line, if desired, or permitting an emptying of the tank 130. The other branch of the T 133 receives a pipe line 136 having a manually-operated valve 136a adjacent the T. The pipe line 136 communicates with the dilution-water supply line 81 and the drain line 87 from the float chamber 86. The pipe line 136 in turn is connected through a branch pipe 137 to the inlet of a pump 138. The discharge end of the pump 138 is connected through a pipe line 139 to the top of the phosphate tank 59. A manually operated valve 140 is provided in the pipe line 139, in order to throttle the pump capacity as desired.

A regulating orifice valve 141 is mounted in the pipe line 136 between the connection with the pipe 81 and the manually-operated valve 136a. The regulating orifice valve 141 has an operating rod 142 connected to the end of a pivoted lever arm 143. The other end of the lever arm 143 is connected to a link rod 144. The link rod 144 is operated by a Sylphon bellows 145 mounted in a housing 146. The bellows 145 has an operating rod 147 extending through the housing and connected to a lever arm 148 pivoted at 148a, one end of which is secured to the link rod 144 and the other end is connected to a tension spring 149.

The interior of the Sylphon bellows communicates with a tube 150 entering a mercury chamber 151. A glass column 152 extends upwardly from the mercury chamber 151 and communicates with a closed chamber 153 at its bottom. As the Sylphon bellows is collapsed, the fluid therein is forced into the mercury chamber 151, thus causing the mercury to rise in the column 152. If desired, a linear scale (not shown) can be placed behind the glass column 152 so that every inch of mercury in the column will designate one foot of differential pressure through the orifice 32. The chamber 153 receives a pipe line 154 communicating with the pipe 105.

The housing 146 for the bellows 145 has a pipe line 155 extending therefrom and connected to the pipe 111 which, in turn, communicates with the pipe 104.

The valve 141 is closed when the pressure on both sides of the orifice 32 in the raw water supply line is equal. However, when water is drawn through the system by the feed pump 67, the differential pressure of the orifice 32 will cause Sylphon bellows 145 to collapse until the displaced fluid therein has caused the mercury column pressure to equal the raw water differential pressure, to thus open the valve 141 in accordance with the pressure drop or flow of raw water through the orifice. The pump 138 will then receive phosphate solution from the tank 130 and will supply the same to the phosphate tank 59. The inlet side of the pump 138 is maintained under a constant pressure through the buoyancy floats described in connection with the tank 70, since this pump also receives dilution water from the supply line 81. The strength of the phosphate solution in the tank 130 is changed in accordance with the excess of chemical in samples taken from a sampling tube 156 communicating with the drain line from the filter tank 63.

If desired, the blow-off water can be supplied to the phosphate tank instead of to the sedimentation tank, by connecting the pipe 25 and orifice valve 25a to the inlet of the pump 138 instead of to the inlet of the pump 90. Alternatively, the blow-off water can be fed to both the sedimentation and the phosphate tank by also connecting the pipe line 25 with the inlet to the pump 138. The amount of blow-off water supplied to either the pump 90 or the pump 138 can be controlled by regulation of the valve 25a in accordance with the caustic alkali strength of samples taken from the sampling tubes 157 or 158 and 156.

Obviously, piston or diaphragm operated valves could be used in place of the Sylphon bellows arrangement for control of the phosphate feed to the tank 59.

From the above description, it should be understood that available chemicals in the blow-down water are utilized for the water-softening process; that the amounts of new chemicals supplied to the sedimentation tank and to the phosphate tank are automatically regulated by demands of the system as determined by a pressure drop in the raw water supply line; that dilution water is supplied to the chemicals for maintaining a constant pressure drop across the regulating orifice valves and for maintaining a constant pressure at the pump inlet; and that the system is therefore entirely automatic.

It will, of course, be understood that various details of the invention may be varied through a wide range without departing from the principles of this invention, and it is, therefore, not the purpose to limit the patent granted hereon otherwise than necessitated by the scope of the appended claims.

I claim as my invention:

1. Water conditioning apparatus comprising a tank, a conduit communicating with the tank, a pump for flowing liquid through the conduit, a dilution water conduit communicating with the inlet of the pump, a valve in said dilution water conduit, a reagent solution conduit communicating with the inlet of the pump, a valve in the reagent solution conduit, a raw water feed conduit for supplying water to the tank, means responsive to water flow through the raw water feed conduit for actuating the valve in the reagent conduit, and means controlling the valve in the dilution water conduit for maintaining a constant pressure drop between the reagent solution conduit and the dilution water conduit.

2. Water conditioning apparatus comprising a water treating tank, a raw water supply conduit for said treating tank, a reagent supply tank, a dilution water supply tank, a dilution water supply conduit for said last tank, a dilution water valve in said dilution water supply conduit, a pump for supplying reagent to the treating tank, a conduit connecting the reagent tank with the pump inlet, a reagent valve in said conduit, a conduit connecting the dilution water tank with the pump inlet, balanced buoyancy floats in said reagent tank and said dilution water tank for actuating the dilution water valve to supply water to the dilution water tank for maintaining a positive pressure at the pump inlet, means creating pressure differentials in the raw water supply conduit, pressure-responsive means actuated by said pressure differentials for operating the reagent valve to control the feeding of reagent to the pump, and connecting means between said raw water supply conduit and said pressure responsive means for transmitting said pressure differentials therebetween.

3. Boiler water conditioning apparatus comprising a flash tank, means for supplying blow-down liquid from a boiler to said flash tank, a standpipe receiving blow-down liquid from said flash tank, a water softening tank, a pump for supplying liquid from the standpipe to the water softening tank, a raw water supply conduit for the water softening tank, flow restriction means in said water supply conduit for creating pressure differentials therein, means sensitive to said pressure differentials for discharging blow-down water from the standpipe, and connecting means between said water supply conduit and said last means for transmitting said pressure differentials therebetween.

4. In water conditioning apparatus for boilers, the combination with a conduit for receiving blow-off liquid from a boiler, of a flash tank receiving the blow-off liquid, a water-softening tank, a pipe joining the upper portion of the flash tank with the water softening tank to supply steam to said water softening tank, a standpipe receiving liquid from the flash tank, a raw water supply conduit for the water softening tank, a coil in said raw water supply conduit extending into said flash tank in heat exchange relation with the liquid in the flash tank, and means for supplying blow-off water from the standpipe to the water softening tank for utilization of chemicals contained in the blow-off water.

5. A hot process water softening apparatus comprising a sedimentation tank, a phosphate reaction tank, means for supplying raw water to the sedimentation tank, means for supplying treated water from the sedimentation tank to the phosphate tank, a lime-soda supply conduit for the sedimentation tank, means for supplying a lime-soda ash reagent through said supply conduit, a phosphate supply conduit for the phosphate reaction tank, means for supplying a phosphate reagent through said last supply conduit, valves in said lime-soda and phosphate conduits, means creating pressure differentials in the raw water supplying means, and pressure responsive means controlled by said means creating pressure differentials and connected to the valves in said conduits for operating the valves to supply just sufficient reagent to the tanks for effecting a desired softening of the raw water.

6. Water softening apparatus for boilers having a continuous blow-down which comprises a sedimentation tank, a plurality of dilution water conduits communicating with said sedimentation tank at different levels therein, a blow-down water conduit receiving blow-down liquid from the boiler and communicating with one of said dilution water conduits, a reagent supply conduit communicating with another of said dilution water conduits, a valve in said reagent supply conduit, a discharge valve in said blow-down water conduit, a raw water conduit communicating with said tank, means in said raw water conduit for creating pressure differentials therein, pressure sensitive means operating said valves to control the amount of reagent supplied to the tank and the discharge of blow-down water and conduits joining the raw water conduit and the pressure sensitive means.

7. Boiler feed water conditioning equipment for boilers having continuous blow-down orifices which comprises a lime-soda sedimentation tank, a phosphate reaction tank, a blow-down water standpipe receiving blow-down liquid from the boiler, a first dilution water conduit communicating with the sedimentation tank below the top thereof, a second dilution water conduit communicating with the sedimentation tank near the top thereof, a third dilution water conduit communicating with the top of the phosphate reaction tank, means connecting the standpipe with the first dilution water conduit, a discharge valve for said standpipe, a lime-soda supply conduit communicating with the second dilution water conduit, means for supplying a lime-soda ash reagent to said conduit, a valve in said lime-soda supply conduit, a phosphate solution supply conduit communicating with the third dilution water conduit, means for supplying a phosphate reagent to said conduit, a valve in said phosphate solution supply conduit, a raw feed water conduit communicating with the top of the sedimentation tank, means in said raw water conduit for creating pressure differentials therein, and pressure transmission means connecting said raw water conduit and all of said valves for actuating said valves to control blow-down discharge and lime-soda solution and phosphate solution feed into the dilution water conduits according to the amount of raw feed water supplied to the sedimentation tank.

8. Water softening apparatus for boilers having a continuous blow-down which comprises a settling tank, means for feeding raw water to said tank, means for spraying raw feed water into the top of the tank, means for spraying chemical reagent into the top of the tank, means for feeding blow-down water into the central portion of the tank, means in said raw water feeding means for creating pressure differentials therein, means for varying the chemical reagent and blow-down water feed to the tank, and pressure transmission means connecting said raw water feeding means and said varying feed means for controlling the chemical reagent and blow-down water feed in accordance with variations in the raw water feed.

9. The process of reducing the hardness of water which comprises continually feeding dilution water to a settling tank, feeding raw water to the tank in accordance with demands for treated water, feeding lime-soda ash solution to the dilution water, controlling the amount of lime-soda ash feed with the raw water feed, heating the ingredients in the tank, settling out precipitated matter from the liquids in the tank, withdrawing clarified liquid from the tank into a phosphate reaction tank, continually supplying dilution water to the phosphate reaction tank, feeding phosphate solution to the dilution water and controlling the phosphate solution feed with the raw water feed to the settling tank.

10. The process of conditioning boiler feed water for a boiler plant which comprises spraying raw water into the top of a settling tank in accordance with the demands of the boiler, continually spraying controlled quantities of dilution water into the top of the tank for commingling with the raw water spray, feeding lime-soda ash solution into the dilution water spray, and proportioning the amount of lime-soda ash solution in accordance with the amount of raw water spray.

11. The process of conditioning boiler feed water for a boiler plant which comprises spraying raw feed water into the top of a settling tank, spraying dilution water into the top of said tank beneath the raw water spray, admixing lime-soda ash solution with the dilution water, proportioning the lime-soda ash solution in accordance with the raw water spray, feeding additional dilution water to the tank below the liquid level thereof, admixing boiler blow-down water with said last-mentioned dilution water, allowing precipitated matter to settle to the bottom of the tank, drawing off clarified liquid from the tank into a phosphate reaction tank, continually supplying dilution water to the phosphate reaction tank, proportioning phosphate solution with said last-mentioned dilution water in accordance with the amount of raw water sprayed into the settling tank, and filtering the water treated in the phosphate reaction tank.

12. The process of conditioning boiler feed water which comprises continually blowing down a boiler, flashing steam from the blow-down water, collecting the blow-down water, heating make-up water with heat from the blow-down water and flashed steam, supplying the heated make-up water to a treating tank, supplying water-treating chemicals to said tank, supplying collected blow-down water to said tank, automatically controlling the chemical feed and blow-down water feed to said tank in accordance with the make-up water to the tank, and automatically discharging excess collected blow-down water to waste.

13. The method of conditioning boiler feed water which comprises supplying make-up water to a treating tank, supplying water-treating chemicals to said tank at different levels in the tank, admixing boiler blow-down water with the chemicals supplied to the lower level of the tank, discharging excessive boiler blow-down water, and automatically controlling chemical feed and the blow-down water feed to the tank in accordance with the make-up water supplied to the tank.

14. The process of conditioning boiler water which comprises feeding proportioned quantities of raw water, water softening chemicals and blow-down boiler water to a settling tank, flowing treated water from the settling tank to a phosphate reaction tank, feeding phosphate water treating solution to said reaction tank, and controlling the amount of boiler blow-down water feed to the settling tank in accordance with the caustic alkalinity of the treated water discharged from the phosphate tank.

15. In water conditioning equipment a tank for reagent solution, a drain line for said tank, a valve in said drain line, a bellows, means connecting said bellows and said valve for co-movement, a housing for said bellows, a water conduit, an orifice plate in said water conduit, a tube connecting the conduit on the inlet side of the orifice with said housing, a mercury column communicating with the interior of the bellows, and a second tube joining the opposite end of the mercury column with said conduit on the outlet side of the orifice whereby pressure differentials on opposite sides of the orifice will effect movement of the bellows to open and close said valve and control discharge of reagent from the tank through said drain line.

16. In water conditioning equipment, a reagent tank, a drain line for said tank, a drain valve in said drain line, a dilution water conduit communicating with said valve, a control valve in said dilution water conduit, means operating said control valve to maintain a constant pressure drop between the drain line and the dilution water conduit, a feed water conduit, means creating pressure differentials in said feed water conduit, a reaction tank for receiving said dilution water, feed water, and reagent from said drain line, and pressure sensitive means controlled by said created pressure differentials for operating said drain valve whereby the reagent draining from said reagent tank to said reaction tank will be controlled only by the pressure differentials in the raw water feed conduit and will be independent of the level of the reagent in the reagent tank.

17. The process of conditioning boiler water which comprises feeding proportioned quantities of raw water, water softening chemicals and blow-down boiler water to a settling tank, reacting the water in the tank with said chemicals and controlling the amount of boiler blow-down water feed to the tank inversely with respect to the degree of caustic alkalinity of the treated water discharged from the tank.

18. The process of conditioning boiler water which comprises feeding proportioned quantities of raw water, water softening chemicals and blow-down boiler water to a settling tank, reacting treated water from the settling tank with a phosphate treating solution, and controlling the amount of boiler blow-down water feed to the settling tank inversely with respect to the degree of caustic alkalinity of the phosphate treated water.

19. Water softening apparatus which comprises a sedimentation tank, a dilution water conduit communicating with the tank, a raw water feed conduit communicating with the tank, a lime-soda solution conduit communicating with the dilution water conduit, means for supplying a lime-soda reagent through said lime-soda solution conduit, a valve in said lime-soda solution conduit, a phosphate reaction tank, means joining the sedimentation tank with the phosphate reaction tank to supply water from the sedimentation tank to the phosphate reaction tank, a dilution water conduit communicating with said phosphate reaction tank, a phosphate supply conduit communicating with said last mentioned dilution water conduit, means for supplying a phosphate reagent through said last mentioned dilution water conduit, a valve in said phosphate solution supply conduit, means in the raw water feed conduit for creating pressure differentials therein, and means in communication with the raw water feed conduit controlled by said pressure differentials for operating both valves to vary the amount of lime-soda solution fed to the sedimentation tank and the amount of phosphate solution fed to the phosphate reaction tank in accordance with the amount of raw feed water fed to the sedimentation tank.

HENRY J. MEIER.